United States Patent [19]
Linden et al.

[11] Patent Number: 4,753,825
[45] Date of Patent: Jun. 28, 1988

[54] VAPOR PERMEATION CURABLE COATINGS COMPRISING POLYMERCAPTAN RESINS AND MULTI-ISOCYANATE CURING AGENTS

[75] Inventors: Gary L. Linden, Bowling Green; Brent A. Blakley, Westerville, both of Ohio

[73] Assignee: Ashland Oil, Inc., Ashland, Ky.

[21] Appl. No.: 905,700

[22] Filed: Sep. 9, 1986

Related U.S. Application Data

[63] Continuation-in-part of Ser. No. 740,181, May 31, 1985, abandoned.

[51] Int. Cl.$^4$ ........................... B05D 1/04; B05D 1/06
[52] U.S. Cl. ..................................... 427/340; 427/426
[58] Field of Search ............. 427/30, 340, 426, 255.6, 427/248.1; 528/73, 65, 85; 428/423.1

[56] References Cited

U.S. PATENT DOCUMENTS 3,058,955 10/1962 Neumann et al. .................... 528/85
3,874,898 4/1975 McInnes .............................. 427/340
4,517,222 5/1985 Blegen ................................. 427/30

*Primary Examiner*—Janyce A. Bell
*Attorney, Agent, or Firm*—Mueller and Smith

[57] ABSTRACT

Disclosed is a method for curing a film of a coating composition under vapor permeation curable conditions. Such method comprises exposing a coating composition to a vaporous tertiary amine catalyst. The coating composition can be in the form of an atomizate which is concurrently generated and mixed with a vaporous tertiary amine catalyst followed by application to a substrate, or can be an applied film of the coating composition which is exposed to the vaporous tertiary amine catalyst. The coating composition comprises a polymercapto-compound and a multi-isocyanate curing agent. The coating composition can be formulated to contain very high solids content (e.g. in excess of 70% and on up to 100% non-volatile solids).

16 Claims, No Drawings

VAPOR PERMEATION CURABLE COATINGS COMPRISING POLYMERCAPTAN RESINS AND MULTI-ISOCYANATE CURING AGENTS

CROSS-REFERENCE TO RELATED APPLICATIONS

This application is a continuation-in-part of application U.S. Ser. No. 06/740,181, filed May 31, 1985, now abandoned.

BACKGROUND OF THE INVENTION

The present invention relates to vapor permeation curable coatings and more particularly to the synthesis and utilization of polymercapto resins therefor.

Vapor permeation curable coatings traditionally are a class of coatings formulated from aromatic hydroxyl-functional polymers and multi-isocyanate cross-linking agents wherein an applied film thereof is cured by exposure to a vaporous tertiary amine catalyst. In order to contain and handle the vaporous tertiary amine catalyst economically and safely, curing chambers were developed. Curing chambers typically are substantially empty boxes through which a conveyor bearing the coated substrate passes and in which the vaporous tertiary amine, normally borne by an inert gas carrier, contacts such coated substrate. The use of aromatic hydroxyl-functional polymers is recommended if a stable one-pack system is required. If two-pack formulations are acceptable, then use of aliphatic hydroxyl-functional resins can be made. Multi-isocyanate cross-linking agents in traditional vapor permeation curable coatings contain at least some aromatic isocyanate groups in order for practical cure rates to be achieved.

Such traditional vapor permeation curable coatings requirements have been altered to a degree by the vaporous amine catalyst spray method disclosed by Blegen in U.S. Pat. No. 4,517,222. Such vaporous catalyst spray method relies on the concurrent generation of an atomize of a coating composition and a carrier gas bearing a catalytic amount of a vaporous tertiary amine catalyst. Such generated atomizate and vaporous catalytic amine-bearing carrier gas flow are admixed and directed onto a substrate to form a film thereof. Curing is rapid and use of a curing chamber is not required. Moreover, all-aliphatic isocyanate curing agents can be utilized in such spray process. Hydroxyl groups on the resin, however, still are required.

One drawback to the requirement of aromatic hydroxyl groups on the resin is the inherent limitation which such aromaticity provides in formulating high solids coatings. The same is true of the requirement of aromaticity in the multi-isocyanate cross-linking agent. Such non-volatile solids content restriction even applies to the vaporous amine catalyst spray method described above.

BROAD STATEMENT OF THE INVENTION

The present invention solves many of the limitations which have been placed on chamber cured vapor permeation curable coatings. The method for curing a film of a coating composition in accordance with the present invention comprises exposing said coating composition as an atomizate which then is applied to a substrate or as an applied film on a substrate to a vaporous tertiary-amine catalyst. The coating composition comprises a polymercapto-compound and a multi-isocyanate (or polyisocyanate) curing agent. As an applied film, the coating composition is cured by exposure of an applied film of said coating composition to a vaporous tertiary amine catalyst in a curing chamber. Alternatively, an atomizate of said coating composition can be generated and admixed with a vaporous tertiary amine catalyst, which mixture then is applied to a substrate and cured.

Another embodiment of the present invention involves the coating composition comprising a hydroxyl-functional compound, a polymercapto-compound, and a multi-isocyanate curing agent. The curing agent may be an all-aliphatic isocyanate curing agent and the polymercapto-compound can be a reactive diluent present in small proportions for catalyzing or enhancing the cure of the polyol resin and the aliphatic isocyanate curing agent. Additionally, the addition of a preformed carbamothioate compound to a polyisocyanate/polyl mixture has been found to promote the isocyanate/hydroxyl reaction.

Advantages of the present invention include the ability to formulate high solids coating compositions containing upwards to 100% non-volatile solids content. Another advantage is the ability to utilize all-aliphatic isocyanate-containing curing agents and still achieve rapid cure in the curing chamber. Another advantage is the unusual high gloss which polymercapto-containing vapor permeation cured coatings possess when cured in a curing chamber. These and other advantages will be readily apparent to those skilled in the art based upon the disclosure contained herein.

DETAILED DESCRIPTION OF THE INVENTION

The use of polymercapto-functional monomers, oligomers, or polymers in vapor permeation curable coatings retains the advantageous properties achieved in the use of aromatic hydroxyl-functional compounds including the ability to formulate single package systems which are storage stable for several hours on up to several days, but which formulations rapidly cure at room temperature by exposure to vaporous tertiary amine catalysts. Several unique benefits additionally are achieved by the use of such resinous or nonresinous mercaptans or thiols. One of these benefits is the ability to formulate very high solids coatings ranging on up to 100% non-volatile solids. Such higher solids content, in part, is due to the freedom which the use of thiols permits in reducing aromatic content of both the resin and the curing agent. That is, aromaticity adjacent the mercapto groups is not required for storage stability nor for curability of the coating composition. Also, aromaticity is not required of the curing agent in order for room temperature rapid cure to be achieved in the presence of vaporous tertiary amine catalysts. It will be appreciated that aromaticity was quite desirable in coating compositions when conventional chamber cure techniques were employed. Another benefit in the ability to formulate coating compositions diminished in aromatic groups is the ability to increase the flexibility of the cured coating composition. This is true it is difficult to arrive at a very flexible system with high elongation since aromatic groups tend to impart steric hindrance to the polymer resulting in increased brittleness. Of course, traditional vapor permeation curable coating compositions contained at least some aromatic curing agent in order for rapid cure to be achieved and contained aromatic hydroxyl functionality on the resin in order to retain benefits of increased pot life of the coating composition. The use of polymercapto resins in accordance with the precepts of the present invention provides greater flexibility in formulation vapor permeation curable coatings.

Monomers, oligomers, and polymers containing pendant mercaptan or thiol groups are commercially available or can be synthesized readily. For example, mercaptan groups can be attached to the oligomer or polymer by esterification of free hydroxyl groups on the polymer, for example, a polyester, a polyacrylate, a polyether, or the like with a mercaptan-terminated acid, such as 3-mercapto propionic acid or thiosalicyclic acid. Similarly, an epoxy-functional resin can be reacted with a mercaptan-terminated acid under acidic conditions for enhancing the preferential reaction of the carboxylic acid group with the epoxy group. Mercaptan groups can be introduced into the oligomer or polymer additionally by reacting pendant primary or secondary amine groups with a mercaptan-terminated acid or by reacting the free-isocyanate groups on an isocyanate-terminated oligomer or polymer with a mercaptan-terminated acid ester having at least two pendant mercaptan groups. Further reaction schemes for introducing the mercaptan groups into an oligomer or polymer include conducting a Michael addition reaction of a polymercaptan with a polyolefin. A further synthesis scheme involves the reaction of an aryl or alkyl halide with NaSH for introducing a pendant mercaptan group into the alkyl compound. It is possible even to react a Grignard reagent with sulfur for introducing a pendant mercaptan group into the structure. In fact, a disulfide can be reduced (e.g. zinc or other catalyst under acid conditions) to produce a mercaptan-functional monomer which may be used as a reactive diluent in vapor permeation curable coatings. Mercaptan groups can be introduced into the oligomer or polymer by numerous other methods which are well known in the art. The mercaptan groups are pendantly attached to the monomer, oligomer or polymer. For purposes of this application, pendant mercaptan groups include terminal mercaptan groups. By pendantly attached is meant that such mercaptan groups are attached to the polymer chain or to a pendant side chain of the polymer or oligomer. The resinous material containing pendant mercaptan groups should be at least difunctional for cross-linking with the curing agent, though higher degrees of functionality may be used additionally. Mono-functional mercaptan-containing resinous materials may be used as reactive diluents, as further elaborated on below.

Various polymercaptans suitable for synthesizing the mercapto-functional resinous materials for use in forming the coating compositions of the present invention include, for example, 1,4-butane dithiol, 2,3-dimercapto propanol, toluene-3,4-dithiol, and alpha,alpha'-dimercapto-p-xylene. Other suitable active mercapto compounds include thiosalicylic acid, mercapto acetic acid, mercapto propionic acid, 2-mercapto ethanol, monododecane dithiol, didodecane dithiol, dithiol phenol, di-para-chlorothiophenol, dimercapto benzothiazole, 3,4-dimercapto toluene, allyl mercaptan, 1,6-hexane dithiol, 1,2-ethane dithiol, benzyl mercaptan, 1-octane thiol, p-thiocresol, 2,3,5,6-tetrafluorothiophenol, cyclohexyl mercaptan, methylthioglycolate, mercapto pyridines, dithioerythritol, 6-ethoxy-2-mercaptobenzothiazol, and the like. Further useful mercaptans can be found in various catalogs of commercially-available mercaptans.

Virtually any oligomer polymer, or resinous compound can be modified to contain pendant mercaptan or thiol groups. Representative resinous materials containing mercaptan groups can be derived from, for example, epoxy and epoxy-modified diglycidyl ethers of bisphenol A structures, various aliphatic polyethylene or polypropylene glycol (diglycidyl ether) adducts, and glycidyl ethers of phenolic resins. Other useful polymers containing pendant mercaptan groups include polyamide resins, for example, condensation products of dimerized fatty acids coreacted with difunctional amine, such as ethylene diamine, followed by reaction with 3-mercapto propionic acid or the like. A variety of acrylic resins and vinyl resins can be readily envisioned for modification in accordance with the precepts of the present invention additonally.

In this regard, it should be understood that virtually any conventional hydroxyl-containing monomer, oligomer, or polymer previously proposed for use in vapor permeation curable coatings can be suitably modified to contain pendant mercaptan groups for use in formulating coating compositions in accordance with the present invention. For example, esterification (or transesterification) of such polyols with a mercaptan-terminated acid is but one technique which can be envisioned readily for use in modifying such prior vapor permeation curable materials for use in formulating the coating compositions of the present invention. While not exhaustive, the following discussion discloses prior vapor permeation curable coating compositions which can be suitably modified. U.S. Pat. No. 3,409,579 discloses a binder composition of a phenol-aldehyde resin (including resole, novolac, and resitole), which preferably is a benzylic ether or a polyether phenol resin. U.S. Pat. No. 3,676,392 discloses a resin composition in an organic solvent composed of a polyether phenol or a methylol-terminated phenolic (resole) resin, U.S. Pat. No. 3,429,848 discloses a composition like that in U.S. Pat. No. 3,409,579 with the addition of a silane thereto.

U.S. Pat. No. 3,789,044 discloses a polyepoxide resin capped with hydroxybenzoic acid, U.S. Pat. No. 3,822,226 discloses a curable composition of a phenol reacted with an unsaturated material selected from unsaturated fatty acids, oils, fatty acid esters, butadiene homopolymers, butadiene copolymers, alcohols, and acids. U.S. Pat. No. 3,836,491 discloses a similar hydroxy-functional polymer (e.g. polyester, acrylic, polyether, etc.) capped with hydroxybenzoic acid. British Pat. No. 1,369,351 discloses a hydroxy or epoxy compound which has been capped with diphenolic acid. British Pat. No. 1,351,881 modifies a polyhydroxy, polyepoxy, or polycarboxyl resin with the reaction product of a phenol and an aldehyde.

U.S. Pat. No. 2,967,117 discloses a polyhydroxy while U.S. Pat. No. 4,267,239 reacts an alkyd resin with para-hydroxybenzoic acid. U.S. Pat. No. 4,298,658 proposes an alkyd resin modified with 2,6-dimethylol-p-cresol.

U.S. Pat. No. 4,343,839, 4,365,039, and 4,374,167 disclose polyester resin coatings especially adapted for flexible substrates. U.S. Pat. No. 4,374,181 discloses resins especially adapted for application to reaction injection molded (RIM) urethane parts. U.S. Pat. No. 4,331,782 discloses a hydroxybenzoic acid-epoxy adduct. U.S. Pat. No. 4,343,924 proposes a stabilized phenol-functional condensation product of a phenol-aldehyde reaction product. U.S. Pat. No. 4,366,193 proposes the use of 1,2-dihydroxybenzene or derivatives thereof in vapor permeation curable coatings. U.S. Pat. No. 4,368,222 discloses the uniqueness of utilizing vapor permeation curable coatings on surface-porous substrates of fibrous-reinforced molding compounds (e.g. SMC). Finally, U.S. Pat. No. 4,396,647 discloses the use of 2,3',4-trihydroxydiphenyl.

It will be appreciated that the foregoing aromatic-hydroxyl polymers or resins as well as many other resins suitably can be modified to contain mercaptan groups for use in formulating coating compositions in accordance with the precepts of the present invention.

Finally, the mercapto resinous materials of the present invention can be utilized for formulating coating compositions ideally suited for the vaporous amine catalyst spray method of Blegen, cited above. Such vaporous amine catalyst spray method comprises the concurrent generation of an atomizate of the coating composition and vaporous tertiary amine, which flows are admixed and applied to a substrate. The increased non-volatile solids content of coating compositions formulated with mercapto resinous materials even can permit the spray application of pigmented coatings containing in excess of 80% non-volatile solids. in this regard, the coating compositions may contain reactive or volatile solvent for formulating the coating compositions, for viscosity control for application (e.g. spraying or the like), or for other purposes as is necessary, desirable, or convenient in conventional fashion.

Multi-isocyanate or polyisocyanate cross-linking agents cross-link with the mercaptan or thiol groups of the resulting adduct-capped polymer under the influence of a vaporous tertiary amine to cure the coating. Aromatic isocyanates may be preferred in order to obtain reasonable pot life and the desired rapid reaction in the presence of the vaporous tertiary amine catalysts at room temperature. For high performance coatings, initial color as well as the discoloration due to sunlight can be minimized by including at least a moderate level of aliphatic isocyanate content in the curing agent. Of course, polymeric isocyanates are employed in order to reduce toxic vapors of isocyanate monomers. Further, alcohol-modified and other modified isocyanate compositions (e.g. thiocyanates) find utility in the invention. Multi-isocyanates (i.e. polyisocyanates) preferably will have from about 2-4 isocyanate groups per molecule for use in the coating composition of the present invention. Suitable multi-isocyanates for use in the present invention include, for example, hexamethylene diisocyanate, 4,4'-toluene diisocyanate (TDI), diphenylmethane diisocyanate (MDI), polymethyl polyphenyl isocyanate (Polymeric MDI or PAPI), m- and p-phenylene diisocyanates, bitolylene diisocyanate, triphenylmethane triisocyanate, tris-(4-isocyanatophenyl)thiophosphate, cyclohexane diisocyanate (CHDKI), bis-(isocyanatomethyl)cyclohexane ($H_6XDI$), dicyclohexylmethane diisocyanate ($H_{12}MDI$), trimethylhexane diisocyanate, dimer acid diisocyanate (DDI), lysine diisocyanate and its methyl ester, isophorone diisocyanate, methyl cyclohexane diisocyanate, 1,5-napthalene diisocyanate, triphenyl methane triisocyanate, xylylene diisocyanate and methyl and hydrogenated derivatives thereof, chlorophenylene-2,4-diisocyanate, and the like and mixtures thereof. Aromatic and aliphatic polyisocyanate dimers, trimers, oligomers, polymers (including biuret and isocyanurate derivatives), and isocyanate functional prepolymers often are available as preformed packages and such packages are suitable for use in the present invention also.

The ratio of mercaptan groups from the mercapto resinous materials to the isocyanate equivalents of the multi-isocyanate cross-linking agents preferably should be greater than about 1:1 and can range on up to about 1:2. The precise intended application of the coating composition often will dictate this ratio or isocyanate index.

As noted above, a solvent or vehicle may be included as part of the coating composition. Volatile organic solvents may include ketones and esters for minimizing viscosity, though some aromatic solvent may be necessary and typically is part of the volatiles contained in commercial isocyanate polymers. Representative volatile organic solvents include, for example, methyl ethyl ketone, acetone, methyl isobutyl ketone, ethylene glycol monoethyl ether acetate (sold under the trademark Cellosolve acetate), and the like. Organic solvents commercially utilized in polyisocyanate polymers include, for example, toluene, xylene, and the like. It should be noted that the effective non-volatile solids content of the coating composition can be increased by incorporation of a relatively low or non-volatile (high boiling) ester plasticizer which is retained for the most part in the cured film. Such suitable ester plasticizers include, for example, dibutyl phthalate, di(2-ethylhexyl)phthlate (DOP), and the like. The porportion of ester plasticizer should not exceed about 5-10% by weight, otherwise loss of mar resistance can occur.

The coating composition additionally can contain opacifying pigments and inert extenders such as, for example, titanium dioxide, zinc oxide, clays such as kaolinite clays, silica, talc, carbon or graphite (e.g. for conductive coatings), and the like. Additionally, the coating compositions can contain tinctorial pigments, corrosion-inhibiting pigments, and a variety of agents typically found in coating compositions. Such additional additives include, for example, surfactants, flow or leveling agents, pigment dispersants, and the like.

As to the performance requirements which are met by the coating composition, it should be noted that the coating composition, polymercapto resin and isocyanate cross-linking agent, can have a minimum pot life of at least 4 hours in an open pot and generally the coating can be formulated to have a pot life which exceeds 8 hours and can range up to 18 hours or more. Such long pot life means that refilling the pot at the plant during shifts generally is not required. Moreover, the pot life of the coating composition in a closed container can exceed one month depending upon formulation of the coating composition. After storage of the coating composition, the stored composition can be cut to application viscosity with suitable solvent (if required) and such composition retains all of the excellent performance characteristics which it initially possessed.

The vaporous amine catalyst will be a tertiary amine including, for example, tertiary amines containing substituents such as alkyl, alkanol, aryl, cycloaliphatic, and mixtures thereof. Additionally, heterocyclic tertiary amines may be suitable for use in the invention also. Representative tertiary amines include, for example, triethyl amine, dimethyl ethyl amine, trimethyl amine, tributyl amine, dimethyl benzyl amine, dimethyl cyclohexyl amine, dimethyl ethanol amine, diethyl ethanol amine, triethanol amine, pyridine, 4-phenylpropyl pyridine, 2,4,6-collidine, quinoline, isoquinoline, N-ethyl morpholine, triethylene, diamine, and the like and mixtures thereof. Additionally, it is conceivable to use amine oxides and quaternary ammonium amines depending upon the practicality of providing such amines in the vaporous phase. A myriad of proprietary tertiary amine catalysts currently are available and should function in the process additionally. It should be noted that the catalytic activity of the tertiary amine catalysts may be enhanced by the addition of complex salts to the coating composition as reported in the bulletin, "The Activation of IPDI by Various Accelerator Systems", Veba-Chemie AG, Gelsenkirchen-Buer, West Germany. Thus, the addition of ferric, manganic, and aluminum salts to the liquid coating composition may be implemented as an embodiment of the present invention.

While the proportion of vaporous amine catalyst may range on up to 6% or more, percentages of less than 1 volume-percent typically will suffice, e.g. between about 0.25 and 1% by volume. It should be cautioned that higher levels of amine catalyst are not recommended where air or sources of molecular oxygen are present as explosive mixtures may result. The tertiary amine catalyst is in vaporous form in a carrier gas which may be inert, such as nitrogen or carbon dioxide, or may be in air, or mixtures thereof. It will be appreciated that depending upon the carrier gas and the particular tertiary amine catalyst of choice, certain minimum temperatures and pressures of the atomizing gas stream must be maintained in order to ensure that the amine catalyst remains vaporous and does not condense in any lines. Additionally, the proportion of amine and carrier gas may be altered depending upon whether a conventional curing chamber is utilized or whether the Blegen vaporous amine catalyst spray method is employed. In this regard, the preferred curing chambers for use with the coating compositions of the present invention are disclosed in U.S. Pat. Nos. 4,491,610 and 4,492,041. It must be recognized, however, that other curing chambers may be utilized, e.g. as disclosed in U.S. Pat. Nos. 3,851,402 and 3,931,684.

Upon exposure to vaporous tertiary amine catalyst, the mercaptan groups of the resinous material and isocyanate groups of the curing agent react to form a cured network of carbamothioate groups (carbamothiolic acid ester groups). The reaction is rapid at room temperature enabling handling of cured parts in a short time following catalyst cure, e.g. often as short as 1-5 minutes. Such rapid curing retention of the coating compositions of the present invention is a decided benefit. In this regard, it will be appreciated that such rapid cure also takes place whether the curing agent is all-aliphatic, all-aromatic, or a mixture of aliphatic and aromatic isocyanates.

In this regard, the use of a minor proportion of mono- or poly-functional mercaptan compounds as a reactive diluent (e.g. up to 20 weight percent) can markedly enhance the reaction between a polyol and aliphatic isocyanate groups of a curing agent under vapor permeation cure conditions. Of a positive benefit in using the mercaptan compounds to enhance the polyolisocyanate reaction, is the retention of performance properties which the polyol and curing agent exhibit without the addition of the mercaptan compounds and even improvement of performance properties on occasion. Besides the in situ formation of carbamothioate groups which appear to be catalytic in nature with respect to the polyol/polyisocyanate reaction, preformed carbamothiate groups (preformed reaction product of a mercapto compound and an isocyanate compound) can be incorporated into the coating composition and a similar catalytic effect observed. The use of a preformed compound may not provide the degree of improvement in cure response as is seen when such groups are formed in situ during the cure of the coating composition. Thus, this aspect of the invention comprises the coating composition being cured in the presence of a compound containing one or more of the following moeities:

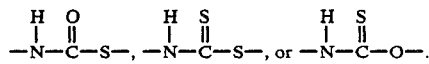

The compound from which such moeity is derived in this preformed embodiment of the invention can be represented as follows:

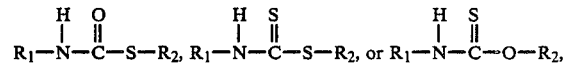

where $R_1$ and $R_2$ each is a monovalent organic radical which desirably is an alkyl or an aryl group.

As the data will demonstrate, the preformed embodiment of the invention does not appear to function to the same degree when an aliphatic isocyanate and an aliphatic polyol comprise the coating composition. Some aromaticity, then, should be present for the preformed embodiment of the invention and preferably such aromaticity is derived from an aromatic isocyanate component of the coating composition. In the in situ preferred embodiment of the invention, however, the film properties and reaction occurring with the mercaptan compound appears to provide a stronger catalytic or promoting effect in the hydroxyl/isocyanate reaction so that aromaticity is not as an important factor as in the preformed embodiment. Nevertheless, some aromaticity may be preferred in the coating composition for both embodiments of the invention.

A variety of substrates can be coated with the coating compositions of the present invention. Substrates include metal, such as, for example, iron, steel, aluminum, copper, galvanized steel, zinc, and the like. Additionally, the coating composition can be applied to wood, fiberboard, RIM, SMC, vinyl, acrylic, other polymeric or plastic material, paper, and the like. Since the coating compositions can be cured at room temperature, thermal damage to thermally-sensitive substrates is not a limitation on use of the coating compositions of the present invention. Further, with the ability to use the Blegen vaporous amine catalyst spray method, the flexibility in use of the coating compositions of the present invention is enhanced even further.

The following examples show how the present invention can be practiced but should not be construed as limiting. In this application, all percentages and proportions of the coating compositions are by weight and all percentages and proportions of the vaporous tertiary amine catalyst are by volume, unless otherwise expressly indicated. Also, all units are in the metric system and all citations referred to herein are expressly incorporated herein by reference.

EXAMPLES

EXAMPLE 1

The nature of VPC cure response of mercaptan groups was evaluated and compared to aliphatic hydroxyl groups on molecules which are structurally identical but for their containing —SH or aliphatic —OH groups. Viscosity and survey performance tests were conducted on the following compositions.

TABLE 1

| Ingredient | Coating (gm.) | | | | | |
|---|---|---|---|---|---|---|
| | 1 | 2 | 3 | 4 | 5 | 6 |
| Ethylene Glycol | 18.6 | — | — | — | — | — |
| 1,2-Ethanedithiol | — | 18.4 | — | — | — | — |
| Butanediol | — | — | 27.0 | — | — | — |
| 1,4-Butanedithiol | — | — | — | 12.2 | — | — |
| Hexanediol | — | — | — | — | 35.4 | — |
| 1,6-Hexanedithiol | — | — | — | — | — | 15.0 |
| Curing Agent[1] | 69.3 | 46.2 | 69.3 | 23.1 | 63.9 | 23.1 |
| MIBK Solvent[2] | 20.0 | 0 | 20.0 | 0 | 20.0 | 0 |
| Wt-% Solids | — | 92.9 | — | 93.5 | — | 94.0 |

[1]Desmodur N-3390 is an aliphatic isocyanate of hexamethylene diisocyanate (NCO content 20%, 90% solids in butyl acetate, equivalent weight of 210, Mobay Chemical Corporation, Pittsburgh, Pa.)
[2]MIBK is methyl isobutyl ketone.

Each of the coating compositions were exposed to 0.9 vol-% triethylamine catalyst (TEA) in a curing chamber and evaluated with the following results.

TABLE 2A

| Ctg.* | Viscosity (cps) | | | | | Cure Time (sec) | Sward[1] Hardness | | MEK[2] Rub | |
|---|---|---|---|---|---|---|---|---|---|---|
| | Initial | 4 hr | 24 hr | 48 hr | 72 hr | | RT[3] | HT[4] | RT | HT |
| 1 | 100 | — | — | Separated | | 600[5] | 18,16 | 14,20 | 100+ | 100+ |
| 2 | 35 | 40 | 60 | 90 | 140 | 60 | 14,14 | 14,14 | 18 | 17 |
| 3 | 100 | | | Semi-Gel | | 600[5] | 6,8 | 6,8 | 15 | 100+ |
| 4 | 125 | 15 | 15 | 25 | 40 | 60 | 6,8 | 6,8 | 9 | 8 |
| 5 | Settled | | | Gelled | | 600[5] | (6) | | (7) | |
| 6 | 30 | 30 | 40 | 65 | 95 | 60 | 2,4 | 4,4 | 6 | 6 |

*Ctg means Coating.
[1]Plate glass is defined as 100 for Sward Hardness; two readings per panel were taken.
[2]Methyl ethyl ketone (MEK) wetted rag rubbed over one area of cured film with moderate thumb pressure until glass substrate is visible.
[3]RT: Sample allowed to stand for 3 days at room temperature prior to testing.
[4]HT: Samples held at 160° C. for 5 minutes after vaporous amine catalyst exposure, then allowed to stand for 3 days at room temperature prior to testing.
[5]Coating not cured after 600 sec. cure time.
[6]Reading could not be taken because the film bunched.
[7]Reading not possible because film puddled.

TABLE 2B

| | SOLVENT RESISTANCE[1] | | | | | | | |
|---|---|---|---|---|---|---|---|---|
| | H2O | | 5% NaOH | | 10% H2SO4 | | Xylene | |
| Ctg. | RT | HT | RT | HT | RT | HT | RT | HT |
| 1 | Pass | Pass | Fail | Pass | Fail | Pass | Pass | Pass |
| 2 | Pass | Pass | Pass | Pass | Pass | Pass | Pass | Pass |
| 3 | Pass | Pass | Fail | Fail | Fail | Pass | Pass | Pass |
| 4 | Pass | Pass | Fail | Fail | Pass | Pass | Pass | Pass |
| 5 | Pass | Pass | Fail | Fail | Fail | Pass | Pass | Pass |
| 6 | Pass | Pass | Pass | Fail | Pass | Pass | Pass | Pass |

[1]The indicated solvent in a pool on the coating is placed under a watch glass for 24 hours at ambient indoor temperature and then the solvent resistance of the coating judged.

The above-tabulated results demonstrate the excellent combination of stability (as determined by the viscosity data) and rapid cure response. In fact, aliphatic hydroxyl groups cured only after two days, whereas the mercaptan groups were cured within a minute or so.

EXAMPLE 2

A variety of isocyanate curing agents were evaluated with glycol dimercaptopropionate (GDP) in the following coating compositions.

TABLE 3

| Ingredient | Coating (g) | | | | | | | | |
|---|---|---|---|---|---|---|---|---|---|
| | 1 | 2 | 3 | 4 | 5 | 6 | 7 | 8 | 9 |
| GDP | 24.4 | 18.3 | 12.2 | 12.8 | 12.2 | 61.0 | 18.3 | 21.0 | 24.4 |
| Curing[1] Agent | 46.2 | 60.3 | 49.8 | 46.2 | 11.1 | 67.3 | 57.8 | 46.2 | 41.6 |
| MIBK | 5.0 | — | 12.0 | 5.0 | — | — | 5.0 | 3.0 | 5.0 |
| Cellosolve[2] Acetate | — | 13.0 | — | — | — | — | — | — | — |
| Wt % Solids | 87.3 | 58.4 | 56.9 | 74.2 | 100 | 100 | 72.5 | 89.2 | 93.0 |

[1]Coating 1-Curing agent was KL5-2444 aliphatic isocyanurate of hexamethylene diisocyanate (NCO content 20%, 90% solids in Cellosolve acetate, equivalent weight of 210, Mobay Chemical Corporation);
Coating 2-Curing agent was Mondur HC, an approximately tetrafunctional reaction product of hexamethylene diisocyanate and toluene diisocyanate (11.5% NCO content, equivalent weight of 365, 60% solids in Cellosolve acetate/xylene, Mobay Chemical Corporation);
Coating 3-Curing agent was trimethylolpropane-m-α,α,α',α'-tetramethylxylene diisocyanate adduct;
Coating 4-Curing agent was Takenate D-120-N trimethylolpropane adduct of hydrogenated xylene diisocyanate (NCO content 11.0%, 75% solids in ethyl acetate, Takeda Chemical Industries);
Coating 5-Curing agent was methane diisocyanate;
Coating 6-Curing agent was meta-α,α,α',α'-tetramethyl xylene diisocyanate (American Cyanamid Company)
Coating 7-Curing agent was Desmodur Z-4370 isocyanurate of isophorone diisocyanate (NCO content ca. 12%, equivalent weight 350, 70% solids in ethylene glycol acetate/xylene (1:1), Mobay Chemical Corporation);
Coating 8-Curing agent was Desmodur N-3390 of Example 1; and
Coating 9-Curing agent was Desmodur KL5-2550 aliphatic polyisocyanate (1,6-hexamethylene diisocyanate, Mobay Chemical Corporation)
[2]Cellosolve acetate is ethylene glycol monoethyl ether acetate (Union Carbide Corporation)

Each of the coatings was cured by exposure to 0.9 vol.-% triethylamine catalyst (except Coating 2 which was exposed to 0.5 vol.-% TEA) in a curing chamber and subjected to the survey performance tests described in Example 1.

TABLE 4A

| Ctg. | Viscosity (cps) | | | | | Cure Time (sec) | Sward[1] Hardness | | MEK[2] Rub | |
|---|---|---|---|---|---|---|---|---|---|---|
| | Initial | 4 hr | 24 hr | 48 hr | 72 hr | | RT[3] | HT[4] | RT | HT |
| 1 | 85 | 90 | 125 | 185 | 310 | 60 | 8,10 | 52,40 | 95 | 90 |
| 2 | 140 | 150 | 215 | 270 | 315 | 60 | 38,46 | 64,68 | 100+ | 100+ |
| 3 | 135 | 135 | 135 | 140 | 150 | 120 | 8,8 | 12,16 | 63 | 73 |
| 4 | 150 | 180 | 325 | 560 | 780 | 120 | 10,12 | 14,14 | 100+ | 100+ |
| 5 | Like Water | | | | | 240 | 34,38 | 72,68 | 2 | 2 |
| 6 | 15 | 20 | 20 | 15 | 25 | 60 | 38,32 | 76,66 | 9 | 3 |

TABLE 4A-continued

| Ctg. | Viscosity (cps) | | | | | Cure Time (sec) | Sward[1] Hardness | | MEK[2] Rub | |
|---|---|---|---|---|---|---|---|---|---|---|
| | Initial | 4 hr | 24 hr | 48 hr | 72 hr | | RT[3] | HT[4] | RT | HT |
| 7 | 105 | 115 | 115 | 125 | 155 | 60 | 60,60 | 52,48 | 100 | 100+ |
| 8 | — | — | Gelled | — | — | 180 | 2,4 | 6,6 | 28 | 85 |
| 9 | 110 | 545 | Gelled | — | — | 60 | 6,8 | 4,4 | 35 | 18 |

TABLE 4B

SOLVENT RESISTANCE

| Coating | H₂O | | 5% NaOH | | 10% H₂SO₄ | | Xylene | |
|---|---|---|---|---|---|---|---|---|
| | RT | HT | RT | HT | RT | HT | RT | HT |
| 1 | Pass | Pass | Pass | Pass | Fail | Fail | Pass | Pass |
| 2 | Pass | Pass | Fail | Fail | Pass | Pass | Pass | Pass |
| 3 | Pass | Pass | Fail | Pass | Pass | Pass | Pass | Pass |
| 4 | Pass | Pass | Pass | Fail | Pass | Pass | Pass | Pass |
| 5 | Pass | Pass | Fail | Pass | Pass | Pass | Pass | Pass |
| 6 | Pass | Pass | Pass | Pass | Pass | Pass | Pass | Pass |
| 7 | Pass | Pass | Fail | Fail | Pass | Pass | Pass | Pass |
| 8 | Pass | Pass | Fail | Fail | Fail | Fail | Pass | Pass |
| 9 | Pass | Pass | Pass | Pass | Fail | Fail | Pass | Pass |

Again, the excellent stability (pot life) of coatings formulated with mercaptan reactants in combination with good cure response is demonstrated.

Also, these coatings possessed a very high solids content which contributes to their uniqueness. Of further note is the ability to utilize all-aliphatic multi-isocyanate curing agents in formulation VPC coatings.

EXAMPLE 3

In this series of tests, trimethylolpropane tris(3-mercaptopropionate), hereinafter TMP-3MP, served as the mercaptan-functional compound which was evaluated with a variety of curing agents as in Example 2.

TABLE 5

| Ingredient | Coating (gm.) | | | | | |
|---|---|---|---|---|---|---|
| | 1 | 2 | 3 | 4 | 5 | 6 |
| TMP-3MP | 20.7 | 20.7 | 27.6 | 20.7 | 20.2 | 20.7 |
| Curing Agent* | 44.4 | 60.3 | 46.2 | 20.8 | 33.6 | 11.1 |
| MIBK | — | — | — | 2.0 | — | — |
| Cellosolve Acetate | 3.0 | 13.0 | 10.0 | — | — | — |
| Wt % Solids | 69.5 | 60.5 | 82.6 | 94.3 | 100 | 100 |

*Coating 1-Curing agent was Mondur CB-60 aromatic polyisocyanate (NCO equivalent of 10.0 to 1.0, Mobay Chemical Corporation).
Coating 2-Curing agent was Mondur HC of Example 2.
Coating 3-Curing agent was KL5-2444 of Example 2.
Coating 4-Curing agent was KL5-2550 of Example 2.
Coating 5-Curing agent was meta-tetramethyl xylene diisocyanate of Example 2.
Coating 6-Curing agent was methane diisocyanate of Example 2.

Each of the coatings was cured by exposure to triethyl amine catalyst, 0.5 vol.-% for Coatings 1 and 2 and 0.9 vol.-% for all other coatings, in a curing chamber and subjected to the survey performance tests described above.

TABLE 6A

| Ctg. | Viscosity (cps) | | | | | Cure Time (sec) | Sward[1] Hardness | | MEK[2] Rub | |
|---|---|---|---|---|---|---|---|---|---|---|
| | Initial | 4 hr | 24 hr | 48 hr | 72 hr | | RT[3] | HT[4] | RT | HT |
| 1 | 150 | 140 | 195 | — | 260 | 60 | 56,60 | 80,84 | 100+ | 100+ |
| 2 | 135 | 145 | 295 | 570 | 1186 | 60 | 62,60 | 62,64 | 100+ | 100+ |
| 3 | Gelled | — | — | — | — | 60 | 14,18 | 48,52 | 100+ | 100+ |
| 4 | 110 | 5800 | Gelled | — | — | 60 | 18,20 | 24,34 | 100+ | 100+ |
| 5 | 60 | 55 | 60 | 80 | 95 | 60 | 34,38 | 64,58 | 37 | 18 |
| 6 | Like Water | — | — | — | — | 240 | 38,40 | 58,58 | 22 | 20 |

TABLE 6B

SOLVENT RESISTANCE

| Ctg. | H₂O | | 5% NaOH | | 10% H₂SO₄ | | Xylene | |
|---|---|---|---|---|---|---|---|---|
| | RT | HT | RT | HT | RT | HT | RT | HT |
| 1 | Pass | Pass | Fail | Pass | Pass | Pass | Pass | Pass |
| 2 | Pass | Pass | Fail | Fail | Fail | Fail | Pass | Pass |
| 3 | Pass | Pass | Pass | Pass | Pass | Pass | Pass | Pass |
| 4 | Pass | Pass | Pass | Pass | Pass | Pass | Pass | Pass |
| 5 | Pass | Pass | Fail | Pass | Pass | Pass | Pass | Pass |

The above-tabulated results once again establish the unique combination of properties exhibited by the inventive coatings: stability, good cure response, and the ability to utilize aliphatic isocyanate curing agents. The performance of these coatings tends to match the performance of the coatings tested in Example 2, even though a tri-functional mercaptan was used in this example compared to a di-functional mercaptan in Example 2. In this regard, compare Coatings 2 of Examples 2 and 3, Coating 3 of Example 3 and Coating 1 of Example 2, Coating 4 of Example 3 and Coating 9 of Example 2, Coating 5 of Example 3 and Coating 6 of Example 2, and Coating 6 of Example 3 and Coating 5 of Example 2. The most noticeable performance improvement in the coatings of Example 3 are in MEK Rubs for Coatings 4, 5, and 6.

EXAMPLE 4

The mercaptan-functional compounds evaluated were dimercaptodiethyl ether (DMDE), pentaerythritol tetra(3-mercaptopropionate) (PT-3MP), and dipentaerythritol hexa(3-mercaptopropionate) (DPH-3MP).

TABLE 7

| Ingredient | Coating (gm.) | | | | |
|---|---|---|---|---|---|
| | 1 | 2 | 3 | 4 | 5 |
| DMDE | 7.2 | 10.8 | — | — | — |
| PT-3MP | — | — | 18.8 | 25.2 | — |
| DPH-3MP | — | — | — | — | 14.2 |
| Curing Agent* | 23.1 | 60.3 | 60.3 | 46.2 | 11.1 |
| MIBK | 10.0 | — | — | 10.0 | — |
| Cellosolve Acetate | — | 7.0 | 15.0 | — | — |
| Wt % Solids | 69.4 | 60.2 | 58.4 | 82.1 | 100 |

*Coatings 1 and 4-Curing agent was KL-5-2444 of Example 2.
Coatings 2 and 3-Curing agent was Mondur HC of Example 2.
Coating 5-Curing agent was methane diisocyanate of Example 2.

Coatings 1, 4, and 5 were cured by exposure to 0.9 vol.-% triethylamine catalyst in a curing chamber while Coatings 2 and 3 were cured by exposure to 0.5vol.-% of the same catalyst. The following survey performance test results were recorded.

TABLE 8A

| Ctg. | Viscosity (cps) | | | | | Cure Time (sec) | Sward[1] Hardness | | MEK[2] Rub | |
|---|---|---|---|---|---|---|---|---|---|---|
| | Initial | 4 hr | 24 hr | 48 hr | 72 hr | | RT[3] | HT[4] | RT | HT |
| 1 | Gelled | — | — | — | — | 60 | 12,14 | 62,64 | 95 | 100 |
| 2 | 110 | 220 | 1212.5 | 3200 | 8300 | 60 | 54,48 | 66,68 | 100+ | 100+ |
| 3 | 130 | 155 | 620 | 2975 | Semi-Gel | 60 | 48,44 | 70,60 | 100+ | 100+ |
| 4 | 130 | Gelled in 5 minutes | | | | 60 | 34,30 | 72,66 | 100+ | 100+ |
| 5 | Milky Gelled (low viscosity) | — | — | — | — | 300 | 12,12 | 10,10 | 50 | 50 |

TABLE 8B

SOLVENT RESISTANCE

| Ctg. | H₂O | | 5% NaOH | | 10% H₂SO₄ | | Xylene | |
|---|---|---|---|---|---|---|---|---|
| | RT | HT | RT | HT | RT | HT | RT | HT |
| 1 | Pass | Pass | Pass | Pass | Fail | Fail | Pass | Pass |
| 2 | Pass | Pass | Fail | Fail | Pass | Pass | Pass | Pass |
| 3 | Pass | Pass | Fail | Fail | Pass | Pass | Pass | Pass |
| 4 | Pass | Pass | Pass | Pass | Pass | Pass | Pass | Pass |
| 5 | Pass | Pass | Fail | Pass | Pass | Pass | Pass | Pass |

Again, the uniqueness of the inventive coatings is demonstrated. The use of aliphatic or mixed aliphatic-/aromatic curing agents for Coatings 1 and 2 or Coatings 3 and 4 does not appear to alter performance significantly. The same can be said of the results of Coating 1 (Example 2), Coating 3 (Example 3), and Coating 4 (Example 4) which used the same curing agent but a difunctional mercaptan (Example 2), a trifunctional mercaptan (Example 3), and a tetrafunctional mercaptan (Example 4).

EXAMPLE 5

The following mercaptan functional compounds were evaluated: polyethylene glycol di(3-mercaptopropionate) (MW of about 776, PEG 776-M), polyethylene glycol di(3-mercaptopropionate) (MW of about 326, PEG 326-M), Rucoflex S-1028-210 (a difunctional polyester, OH no. of about 210, Ruco Chemical Co., Hicksville, N.Y.) capped with 3-mercaptopropionic acid (R-3MP), polypropylene glycol (Dow P1200, MW of about 1200, Dow Chemical Company, Midland, Mich.) capped with 3-mercaptopropionic acid (PG-3MP), Tone M-100 homopolymer (polycaprolactone monoacrylate homopolymer, MW of about 344, Union Carbide Corporation, Danbury, Conn.) capped with 3-mercaptopropionic acid (T100-3MP), and Tone 200 (difunctional polycaprolactone, OH no. of 215, Union Carbide Corporation, Danbury, Conn.) capped with 3-mercaptopropionic acid (T200-3MP).

TABLE 9

Coating (gm.)

| Ingredient | 1 | 2 | 3 | 4 | 5 | 6 |
|---|---|---|---|---|---|---|
| PEG 776-M | 38.2 | — | — | — | — | — |
| PEG 326-M | — | 32.6 | — | — | — | — |
| R-3MP | — | — | 72.8 | — | — | — |
| PG-3MP | — | — | — | 56.5 | — | — |
| T100-3MP | — | — | — | — | 41.4 | — |
| T200-3MP | — | — | — | — | — | 34.9 |
| Curing Agent* | 23.1 | 46.2 | 46.2 | 23.1 | 23.1 | 23.1 |
| MIBK | — | 5.0 | 20.0 | 5.0 | 10.0 | 5.0 |
| Wt % Solids | 96.3 | 88.5 | 81.3 | 88.9 | 82.4 | 87.3 |

*Desmodur N-3390 curing agent of Example 1

Each of the coatings was cured by exposure to 0.9 vol-% triethylamine catalyst in a curing chamber except for Coating 1 which air dried in one minute. The following survey performance test results were recorded.

TABLE 10A

| Ctg. | Viscosity (cps) | | | | | Cure Time (sec) | Sward[1] Hardness | | MEK[2] Rub | |
|---|---|---|---|---|---|---|---|---|---|---|
| | Initial | 4 hr | 24 hr | 48 hr | 72 hr | | RT[3] | HT[4] | RT | HT |
| 1 | Exothermed and Gelled | | | | | — | 8,6 | 8,8 | 2 | 3 |
| 2 | 90 | 90 | 135 | — | — | 60 | 6,4 | 4,4 | 40 | 32 |
| 3 | 135 | 140 | 240 | — | — | 60 | 2,4 | 2,4 | 30 | 16 |
| 4 | 150 | Semi-Gelled | | — | — | 60 | 2,4 | 2,2 | 5 | 5 |
| 5 | 120 | 145 | 175 | 190 | 210 | 60 | 2,0 | 0,0 | 6 | 7 |
| 6 | 120 | 120 | 235 | 328 | 530 | 60 | 4,4 | 4,4 | 16 | 21 |

TABLE 10B

SOLVENT RESISTANCE

| Ctg. | H₂O | | 5% NaOH | | 10% H₂SO₄ | | Xylene | |
|---|---|---|---|---|---|---|---|---|
| | RT | HT | RT | HT | RT | HT | RT | HT |
| 1 | Fail | Fail | Fail | Fail | Fail | Fail | Pass | Fail |
| 2 | Pass | Pass | Fail | Fail | Fail | Fail | Pass | Pass |
| 3 | Pass | Pass | Fail | Fail | Pass | Pass | Pass | Pass |
| 4 | Pass | Pass | Fail | Fail | Fail | Fail | Fail | Fail |
| 5 | Pass | Pass | Fail | Fail | Fail | Fail | Pass | Pass |
| 6 | Pass | Pass | Pass | Fail | Fail | Fail | Pass | Pass |

With respect to Coatings 1 and 2, the lower molecular weight polyether (Coating 2) had a longer pot life, superior MEK resistance, and superior solvent resistance compared to the higher molecular weight polyether (Coating 1). With respect to Coatings 3 and 4, the Rucoflex-based system (Coating 3) yielded better pot life, solvent resistance, and MEK rub resistance compared to the polypropylene glycol-based system (Coating 4). The performance of both polycaprolactone-based systems (Coatings 5 and 6) were about equivalent.

EXAMPLE 6

Several additional mercaptan-functional resins were synthesized from the ingredients set forth below.

TABLE 11

| Ingredient | Resin (moles) | | | | |
|---|---|---|---|---|---|
| | 34 | 37 | 52 | 43 | DN |
| Adipic Acid | 2 | — | 3.5 | 2 | — |
| Neopentyl Glycol | 1 | — | — | — | — |
| Iso-Phthalic Acid | 1 | — | — | — | — |
| Cardura E[(1)] | 1 | — | — | — | — |
| Trimethylol Propane | 2 | — | 1 | 1 | — |
| Acrylic Acid | — | 1.0 | — | — | — |
| Isobutyl Acrylate | — | 2.08 | — | — | — |
| 1,3-Butylene Glycol | — | — | 3.2 | — | — |
| Propylene Glycol | — | — | — | 1.64 | — |
| N-3390[(2)] | — | — | — | — | 1.0 |
| 3-Mercaptopropionic Acid | Excess | — | Excess | — | — |
| 2-Mercaptoethanol | — | Excess | — | — | Excess |
| Thiosalicylic Acid | — | — | — | 2 | — |

[(1)]Cardura E is a glycidyl ester of Versatic 911 acid which is reported to be a mixture of aliphatic mostly tertiary acids with 9-11 carbon atoms (Cardura and Versatic being trademarks of Shell Chemical Company, New York, New York).
[(2)]Desmodur N-3390 of Example 1.

Coatings were compounded from the above-tabulated resins as follows:

TABLE 12

| Ingredient | Coating (gm.) | | | | |
|---|---|---|---|---|---|
| | 234 | 237 | 252 | 243 | 2DN |
| Resin 34 | 41.9 | — | — | — | — |
| Resin 37 | — | 105.5 | — | — | — |
| Resin 52 | — | — | 48.8 | — | — |
| Resin 43 | — | — | — | 48.8 | — |
| Resin DN | — | — | — | — | 44.9 |
| Curing Agent* | 40.2 | 23.1 | 23.1 | 23.1 | 23.1 |
| MIBK | — | — | 21.0 | 10.0 | — |
| Cellosolve Acetate | 17.0 | — | — | — | — |
| N—Methyl Pyrrolidone | — | — | — | — | 27.0 |
| Wt. % Solids | 59.6 | 49.9 | 74.3 | 66.4 | 53.7 |

*Coating 234-Curing agent was Mondur HC of Example 2.
Coatings 237, 252, 243, and 2DN-Curing agent was Desmodur N-3390 of Example 1.

Coating 234 was cured by exposure of 0.5 vol.-% triethylaminecatalyst while all other coatings were exposed to 0.9 vol.-% of catalyst. The following survey performance test results were recorded.

TABLE 13A

| Ctg. | Viscosity (cps) | | | | | Cure Time (sec) | Sward[(1)] Hardness | | MEK[(2)] Rub | |
|---|---|---|---|---|---|---|---|---|---|---|
| | Initial | 4 hr | 24 hr | 48 hr | 72 hr | | RT[(3)] | HT[(4)] | RT | HT |
| 234 | 145 | 180 | 760 | 340 | 400 | 60 | 76,68 | 74,74 | 65 | 100+ |
| 237 | 60 | Gelled in 5 minutes | | | | 60 | 43,46 | 62,54 | 10 | 17 |
| 252 | 135 | 285 | 890 | Gelled | — | 60 | 4,2 | 4,2 | 8 | 0 |
| 243 | 130 | 8050 | Gelled | — | — | 60 | 28,30 | 44,36 | 42 | 37 |
| 2DN | 135 | 135 | 200 | 245 | 330 | 180 | 18,22 | 34,32 | 11 | 19 |

TABLE 13B

| | SOLVENT RESISTANCE | | | | | | | |
|---|---|---|---|---|---|---|---|---|
| | H2O | | 5% NaOH | | 10% H2SO4 | | Xylene | |
| Ctg. | RT | HT | RT | HT | RT | HT | RT | HT |
| 234 | Pass | Pass | Fail | Fail | Pass | Pass | Pass | Pass |
| 237 | Fail | Pass | Fail | Fail | Pass | Pass | Fail | Fail |
| 252 | Pass | Pass | Fail | Fail | Fail | Fail | Pass | Pass |
| 243 | Pass | Pass | Fail | Fail | Pass | Pass | Pass | Pass |
| 2DN | Pass | Pass | Fail | Pass | Fail | Fail | Pass | Pass |

Coating 234 clearly provided the best performance as the above-tabulated results reveal. Coating 237 lacked pot life and possessed only fair solvent resistance, yet provided fairly good Sward Hardness. Coating 252 was a bit soft, but may be improved by the addition of aromatic structure to the resin backbone. Coating 243 which contained aromatic mercaptan groups performed admirably but for its short pot life. Finally, coating 2DN possessed good properties but for some sensitivity to MEK rub resistance.

EXAMPLE 7

In this example, GDP of Example 2 was used as a reactive diluent along with aromatic hydroxyl-functional resins in order to ascertain whether cure speed with aliphatic isocyanates could be improved. The following polyol resins were evaluated.

Polyol 274: Tone M-100 homopolymer of Example 5 capped with p-hydroxy benzoic acid.
Polyester Polyol: Aromatic hydroxyl-terminated polyester of Example 1 of U.S. Pat. No. 4,374,167.
Acrylic Polyol: Butyl acrylate (4 moles), butyl methacrylate (4 moles), styrene (1 mole), 2-ethyl hexylacrylate (2 moles), glycidyl methacrylate (2 moles), diphenolic acid (2 moles, second stage reaction).

Coatings were formulated from these polyol resins, Desmodur N-3390 curing agent of Example 1, and varying amounts of GDP. Curing conditions (0.9 vol.-% TEA catalyst) as described above were utilized again with the following results being recorded.

TABLE 14

| | Polyol 274 | | | | | | | |
|---|---|---|---|---|---|---|---|---|
| | 0% GDP | | 5% GDP | | 10% GDP | | 20% GDP | |
| Test | RT | HT | RT | HT | RT | HT | RT | HT |
| Cure (sec) | 300 | 300 | 240 | 240 | 180 | 180 | 180 | 180 |
| Sward Hardness | 4,4 | 6,4 | 4,4 | 6,6 | 4,4 | 4,6 | 2,2 | 2,2 |
| MEK Rubs | 9 | 5 | 10 | 13 | 13 | 13 | 7 | 9 |
| Solvents: | | | | | | | | |
| H2O | Pass | Pass | Pass | Pass | Pass | Pass | Pass | Pass |
| 5% HaOH | Fail | Fail | Fail | Fail | Fail | Fail | Fail | Fail |
| 10% H2SO4 | Pass | Pass | Pass | Pass | Pass | Pass | Pass | Pass |
| Xylene | Pass | Pass | Pass | Pass | Pass | Pass | Pass | Pass |

TABLE 15

| | Polyester Polyol | | | | | | | |
|---|---|---|---|---|---|---|---|---|
| | 0% GDP | | 5% GDP | | 10% GDP | | 20% GDP | |
| Test | RT | HT | RT | HT | RT | HT | RT | HT |
| Cure (sec) | 240 | 240 | 180 | 180 | 180 | 180 | 120 | 120 |
| Sward Hardness | 56,60 | 54,42 | 66,68 | 54,58 | 56,58 | 54,54 | 62,62 | 58,52 |
| MEK Rubs | 29 | 15 | 48 | 22 | 49 | 27 | 39 | 28 |
| Solvents: | | | | | | | | |
| H2O | Pass | Pass | Pass | Pass | Pass | Pass | Pass | Pass |
| 5% HaOH | Pass | Pass | Pass | Pass | Pass | Pass | Pass | Pass |
| 10% H2SO4 | Pass | Fail | Pass | Fail | Pass | Fail | Pass | Pass |
| Xylene | Pass | Pass | Pass | Pass | Pass | Pass | Pass | Pass |

TABLE 16

| | Acylic Polyol | | | | | | | |
|---|---|---|---|---|---|---|---|---|
| | 0% GDP | | 5% GDP | | 10% GDP | | 20% GDP | |
| Test | RT | HT | RT | HT | RT | HT | RT | HT |
| Cure (sec) | 180 | 180 | 180 | 180 | 180 | 180 | 120 | 120 |
| Sward | 44,48 | 86,82 | 56,52 | 92,84 | 48,52 | 86,82 | 36,32 | 74,66 |

TABLE 16-continued

| | Acylic Polyol | | | | | | | |
|---|---|---|---|---|---|---|---|---|
| | 0% GDP | | 5% GDP | | 10% GDP | | 20% GDP | |
| Test | RT | HT | RT | HT | RT | HT | RT | HT |
| Hardness | | | | | | | | |
| MEK Rubs | 39 | 30 | 44 | 32 | 35 | 37 | 31 | 45 |
| Solvents: | | | | | | | | |
| $H_2O$ | Pass | Pass | Pass | Pass | Pass | Pass | Pass | Pass |
| 5% NaOH | Pass | Pass | Fail | Fail | Fail | Pass | Fail | Pass |
| 10% $H_2SO_4$ | Pass | Pass | Fail | Pass | Fail | Fail | Fail | Pass |
| Xylene | Pass | Pass | Pass | Pass | Pass | Pass | Pass | Pass |

The above-tabulated results demonstrate that cure speed of aliphatic isocyanate/polyol coatings can be increased by the addition of a mercaptan compound while maintaining, if not improving, performance.

EXAMPLE 8

Duplicate pigmented formulations were compounded for long-term QUV evaluation as follows:

TABLE 17

| Ingredient | 78E | 79B |
|---|---|---|
| GDP | 36.6 | 36.6 |
| $TiO_2^{(1)}$ | 38.5 | 38.5 |
| Curing Agent[2] | 69.3 | 69.3 |
| MIBK | 20.0 | 20.0 |
| FC-430 Surfactant[3] | 8 drops | 8 drops |
| Viscosity | 55 cps | 55 cps |
| Solids (wt. %) | 83.6 | 83.6 |

[1]RCL-6 titanium dioxide pigment (SCM Corporation, Baltimore, Md.), pre-formed pigment grind (Hegman 7) with GDP (122.0 g GDP and 128.4 g RCL-6).
[2]Desmodur N-3390 of Example 1.
[3]FC-430 surfactant is a non-ionic fluorocarbon used at 25% in MEK (Minnesota Mining and Manufacturing Company).

The coatings were applied to RIM substrates by the Blegen vaporous catalyst spray method described above (0.25 vol.-% dimethylethanol amine catalyst). Both coatings displayed excellent cure response and good gloss. The following optical measurements (Hunter Color Difference readings) were recorded.

TABLE 18

| Weathering | Resin 78E | | | Resin 79B | | |
|---|---|---|---|---|---|---|
| (hours) | L | Δa | Δb | L | Δa | Δb |
| Initial | 94.7 | −0.7 | +1.2 | 94.4 | −0.8 | +0.5 |
| 200 | 94.2 | −0.5 | +2.0 | 93.7 | −0.6 | +1.3 |
| 300 | 93.9 | −0.4 | +2.3 | 93. | −0.5 | +1.3 |
| 500 | 94.2 | −0.8 | +2.3 | 93.3 | −0.8 | +1.5 |

Thus, the anti-yellowing behavior of these coatings is demonstrated.

EXAMPLE 9

Coating 9 of Example 2 and Coating 234 of Example 6 were tested and found to possess elongations of 166% and 4.5%, respectively (at failure of coating on the substrate). The same coatings, however, possessed average tensile strengths of 115.5 kg/cm$^2$ (1643 psi) and 151.2 kg/cm$^2$ (2151 psi), respectively.

EXAMPLE 10

A preformed carbamothioate co-catalyst, 4423-195, was made from trimethylolpropane tri(3-mercaptopropionate) (TMP-3MP, 142.9 g), phenyl isocyanate (119 g), methyl isobutyl ketone solvent (112 g), and Amberlyst A-21 catalyst beads (acidic ion exchange resin, 5 g) by holding this mixture for 8 hours followed by removal of the catalyst beads by filtration. No appreciable residual mercaptan or isocyanate were detected.

Coating compositions were formulated without the co-catalyst and with 5% by weight of the co-catalyst. Each sample was applied by the Blegen catalyst spray method described above using 0.6 vol-% dimethylethanol amine catalyst. The coatings formulations were made at an isocyanate index (NCO:OH) molar ratio) of 1:1 and cut to application viscosity of 60 cps with MIBK solvent. Cure response data are set forth below.

TABLE 19

| | Formulation No. (wt. Parts) | | | |
|---|---|---|---|---|
| Ingredient* | 4423-196-1 | 4423-197-2 | 4423-197-3 | 4423-197-4 |
| Polyester Polyol | 50.3 | 50.3 | — | — |
| DESMODUR HL | 40.2 | — | 40.2 | — |
| DESMOPHEN 800 | — | — | 19.5 | 19.5 |
| DESMODUR N3390 | — | 21.6 | — | 21.6 |
| MIBK | 25.0 | 20.0 | 21.0 | 20.0 |

*Polyester Polyol of Example 7.
DESMODUR HL is DESMODUR HC (Example 2) but with butyl acetate solvent.
DESMOPHEN 800 polyester polyol, 100% n.v. solids, OH no. 290, Mobay Chemical Co.
DESMODUR N3390, See Example 1.

TABLE 20

| | Tack Free Time (min.) | |
|---|---|---|
| Formulation No. | Control | 5 wt % Co-Catalyst |
| 4423-196-1 | 5 | Immediate |
| 4423-197-2 | 100 | 3 |
| 4423-197-3 | 5 | Immediate |
| 4423-197-4 | <100 | 6 |

This data unquestionably demonstrates the efficacy of the co-catalyst in promoting the hydroxyl/isocyanate reaction.

EXAMPLE 11

Preformed mercapto/isocyanate or mercapto/thiocyanate compounds were evaluated for their effect in promoting the hydroxyl/isocyanate curing reaction. The following reactants were used to make the preformed compounds evaluated in this example.

TABLE 21

| Compound No. | Mercapto Reactant | Isocyanate Reactant |
|---|---|---|
| 4541-85-1 | Methyl 3-mercaptopropionate | Phenyl thiocyanate |
| 4541-85-2 | Methyl 3-mercaptopropionate | Butyl isocyanate |
| 4541-85-3 | Methyl 3-mercaptopropionate | Butyl thiocyanate |
| 4541-85-4 | Methyl 3-mercaptopropionate | Phenyl isocyanate |

The foregoing compounds were dissolved in methyl isobutyl ketone (MIBK) solvent at 10% solids. These compounds (co-catalysts) were tested at 1% and 5% by weight levels.

The various coating compositions tested were applied by the Blegen vaporous amine spray method of U.S. Pat. No. 4,517,222 using vaporous dimethylethanol amine (DMEOLA) at 0.7 vol-%. Duplicate samples were cured at ambient indoor room temperature or were subjected to a 5 minute bake at about 121.1° C. (250° F.). The data reported to the left of the slash are for the ambient temperature samples while the data to the right of the slash are for the post-cure baked samples. Data lacking a slash are for the ambient temperature samples only. The coating composition formulation and the results recorded are set forth below.

TABLE 22

| Test* Data | Formulation No. | | | | | | | | |
|---|---|---|---|---|---|---|---|---|---|
| | 4541-86-1 | 4541-86-2 | 4541-86-3 | 4541-86-5 | 4541-86-6 | 4541-86-8 | 4541-86-9 | 4541-86-11 | 4541-86-12 |
| Co-Catalyst | None | 4541-85-1 | 4591-85-1 | 4541-85-2 | 4541-85-2 | 4541-85-3 | 4541-85-3 | 4541-85-4 | 4541-85-4 |
| Pot Life (cps) | | | | | | | | | |
| Init. | 50 | 50 | 50 | 50 | 50 | 50 | 50 | 50 | 50 |
| 4 Hr | 65 | 75 | 85 | 65 | 90 | 145 | gel | 75 | 90 |
| 24 Hr | 115 | 110 | 125 | 105 | 130 | gel | gel | 130 | 130 |
| 48 Hr | 360 | 225 | 220 | 225 | 195 | gel | gel | 350 | 235 |
| 72 Hr | gel | gel | gel | gel | gel | gel | gel | gel | gel |
| Formulation (g) | | | | | | | | | |
| VIC 5033 | 50.3 | 50.3 | 50.33 | 50.3 | 50.3 | 50.3 | 50.3 | 50.3 | 50.3 |
| Mondur HC | 36.5 | 36.5 | 36.5 | 36.5 | 36.5 | 36.5 | 36.5 | 36.5 | 36.5 |
| MIBK | 27.0 | 22 | 0 | 22 | 0 | 22 | 0 | 22 | 0 |
| Co-Catalyst | — | 5.4 | 27 | 5.4 | 27 | 5.4 | 27 | 5.4 | 27 |
| Tack Free (min) | 5/yes | 1/yes | 1/yes | 3/yes | 3/yes | 2/yes | | 4/yes | 4/yes |
| MEK Rubs | | | | | | | | | |
| 1 Hr | 15/45 | 22/45 | 20/46 | 37/56 | 38/60 | 65/143 | | 32/55 | 36/58 |
| 24 Hr | 40/78 | 40/74 | 53/73 | 70/111 | 74/96 | 147/327 | | 140/231 | 135/210 |
| 72 Hr | 147/157 | 155/171 | 156/180 | 173/200 | 175/200 | 137/348 | | 265/+500 | +500/+500 |

*VIC 5033 is a phenolic acrylic polyol, equivalent wt 504, 69.9% n.v. solids, OH no. 111, Ashland Chemical Company, VIC is a registered trademark
MONDUR HC- see Example 2
MIBK is methyl isobutyl ketone
MEK Rubs is methyl ethyl ketone double rubs.

TABLE 23

| Test* Data | Formulation No. | | | | | | | | |
|---|---|---|---|---|---|---|---|---|---|
| | 4541-88-1 | 4541-88-2 | 4541-88-3 | 4541-88-5 | 4541-88-6 | 4541-88-8 | 4541-88-9 | 4541-88-11 | 4541-88-12 |
| Co-Catalyst | None | 4541-85-1 | 4541-85-1 | 4542-85-2 | 4541-85-2 | 4541-85-3 | 4541-85-3 | 4541-85-4 | 4541-85-4 |
| Pot Life (cps) | | | | | | | | | |
| Init. | 30 | 30 | 30 | 30 | 30 | 30 | 30 | 30 | 30 |
| 4 Hr | 425 | 475 | 500 | 450 | 435 | 460 | 450 | 450 | 475 |
| 24 Hr | gel | gel | gel | gel | gel | gel | gel | gel | gel |
| 48 Hr | gel | gel | gel | gel | gel | gel | gel | gel | gel |
| 72 Hr | gel | gel | gel | gel | gel | gel | gel | gel | gel |
| Formulation (g) | | | | | | | | | |
| K-flux 148 | 23.9 | 23.9 | 23.9 | 23.9 | 23.9 | 23.9 | 23.9 | 23.9 | 23.9 |
| Mondur HC | 36.5 | 36.5 | 36.5 | 36.5 | 36.5 | 36.5 | 36.5 | 36.5 | 36.5 |
| MIBK | 24 | 19 | 19 | 19 | 0 | 19 | 0 | 19 | 0 |
| Co-Catalyst | | 5 | 5 | 5 | 24 | 5 | 24 | 5 | 24 |
| Tack Free (min) | 10/yes | 10/yes | 8/yes | 10/yes | 10/yes | 8/yes | 8/yes | 6/yes | 6/yes |
| MEK Rubs | | | | | | | | | |
| 1 Hr | 8/15 | 15/35 | 14/39 | 21/69 | 26/38 | 19/57 | 35/67 | 40/45 | 35/89 |
| 24 Hr | 40/36 | 40/45 | 32/42 | 37/43 | 39/48 | 40/45 | 35/67 | 40/45 | 37/112 |
| 72 Hr | 206/217 | 195/210 | 135/145 | 206/225 | 200/197 | 230/212 | 202/217 | 197/190 | 175/202 |

*K-FLEX 148 is a flexible polyester polyol, 100% n.v. solids, OH No. 235, King Industries.

TABLE 24

| Test* Data | Formulation No. | | | | | | | | |
|---|---|---|---|---|---|---|---|---|---|
| | 4541-89-1 | 4541-89-2 | 4541-89-3 | 4541-89-5 | 4541-89-6 | 4541-89-8 | 4541-89-9 | 4541-89-11 | 4541-89-12 |
| Co-Catalyst | None | 4541-85-1 | 4541-85-1 | 4541-85-2 | 4541-85-2 | 4541-85-3 | 4541-85-3 | 4541-85-4 | 4541-85-4 |
| Pot Life (cps) | | | | | | | | | |
| Init. | 70 | 70 | 70 | 70 | 70 | 70 | 70 | 70 | 70 |
| 4 Hr | — | — | — | — | — | — | — | — | — |
| 24 Hr | 115 | 105 | 110 | 120 | 120 | 115 | 120 | 110 | 115 |
| 48 Hr | 150 | 140 | 150 | gel | gel | gel | 175 | 160 | 150 |
| 72 Hr | — | — | — | — | — | — | — | — | — |
| Formulation (g) | | | | | | | | | |
| VIC 5033 | 40.1 | 40.1 | 40.1 | 40.1 | 40.1 | 40.1 | 40.1 | 40.1 | 40.1 |
| Des N3390 | 21.6 | 21.6 | 21.6 | 21.6 | 21.6 | 21.6 | 21.6 | 21.6 | 21.6 |
| MIBK | 24 | 19 | 0 | 19 | 0 | 19 | 0 | 19 | 0 |
| Co-Catalyst | — | 5 | 24 | 5 | 24 | 5 | 24 | 5 | 24 |
| Tack Free (min) | 90/yes | 90/yes | 90/yes | 90/yes | 90/yes | 90/yes | 90/yes | 90/yes | 90/yes |
| MEK Rubs | | | | | | | | | |
| 1 Hr | /11 | /12 | /15 | /17 | /13 | /18 | /20 | /15 | /17 |
| 24 Hr | 47/55 | 52/51 | 55/55 | 44/52 | 49/57 | 50/55 | 55/60 | 50/55 | 50/58 |
| 72 HR | 120/189 | 111/202 | 117/197 | 110/189 | 109/195 | 110/185 | 120/205 | 135/185 | 102/185 |

*DESMODUR N3390-see Example 1

These results demonstrate that the preformed thiourethane co-catalyst is effective in improving the cure of the polyol/polyisocyanate coating composition. The 4541-85-4 co-catalyst appeared to be the most effective of the compounds evaluated, though all of the compounds were effective in promoting the cure.

We claim:

1. Method for curing a film of a coating composition which comprises exposing said coating composition as an atomizate which then is applied to a substrate or as an applied film on a substrate to a vaporous tertiary amine catalyst, said coating composition comprising a polymercapto compound and a polyisocyanate curing agent.

2. The method of claim 1 wherein said coating composition is dispersed in a fugitive organic solvent.

3. The method of claim 1 wherein said polymercapto compound is a monomer, oligomer, or polymer.

4. The method of claim 1 wherein the molar ratio of mercapto groups to isocyanate groups in said coating composition is between about 1:1 and 1:2.

5. The method of claim 1 wherein said coating composition also contains a particulate filler.

6. The method of claim 1 wherein said polymercapto compound is selected from or the mercapto groups thereon are derived from the group consisting of 1,4-butane dithiol, 2,3-dimercapto propanol, toluene-3,4-dithiol, alpha,alpha'-dimercapto-p-xylene thiosalicyclic acid, mercapto acetic acid, 2-mercapto ethanol, monododecane dithiol, didodecane dithiol, dithiol phenol, dipara-chlorothiophenol, dimercapto benzothiazole, 3,4-dimercapto toluene, allyl mercaptan, 1,6 hexane dithiol, benzyl mercaptan, 1-octane thiol, p-thiocresol, 2,3,5,6-tetrafluorothiophenol, cyclohexyl mercaptan, methylthioglycolate, mercapto pyridines, dithioerythritol, 6-ethoxy-2-mercaptobenzothiazol, and mixtures thereof.

7. The method of claim 1 wherein the coating composition is cured by exposure of an applied film thereof to a vaporous tertiary amine catalyst.

8. The method of claim 1 wherein an atomizate of said coating composition concurrently generated with a vaporous tertiary amine catalyst are admixed, said mixture applied to a substrate, and said coating composition cured.

9. The method of claim 1 wherein said curing agent is selected from an aliphatic polyisocyanate curing agent, an aromatic polyisocyanate curing agent, and mixtures thereof.

10. In a method for curing the film of coating composition which comprises exposing said coating composition as an atomizate which then is applied to a substrate or as an applied film on a substrate to a vaporous tertiary amine catalyst, said coating composition comprising a polyol and a polyisocyanate curing agent, the improvement which comprises said coating composition being cured in the presence of a thio-urethane compound formed by the reaction of a mercapto compound and an isocyanate compound.

11. The method of claim 10 wherein said coating composition additionally comprises a mercapto compound when forms said thio-urethane compound in situ during the curing of said coating composition.

12. The method of claim 10 wherein said thio-urethane compound is pre-formed and added to said coating composition.

13. The method of claim 10 wherein said thio-urethane compound is represented by one of the following structures:

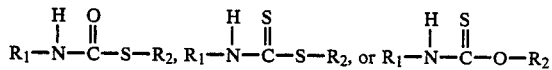

where $R_1$ and $R_2$ each is a monovalent organic radical.

14. The method of claim 13 wherein $R_1$ and $R_2$ each is an alkyl or aryl group.

15. The method of claim 11 wherein said mercapto compound is a monomercapto compound, a polymercapto compound, or mixtures thereof.

16. The method of claim 10 wherein said polyisocyanate curing agent is selected from an aromatic polyisocyanate, an aliphatic polyisocyanate, and mixtures thereof; and said polyol is selected from an aromatic polyol, or mixtures of an aliphatic polyol and an aromatic polyol.

* * * * *